United States Patent [19]
Sasaki et al.

[11] Patent Number: 5,294,427
[45] Date of Patent: Mar. 15, 1994

[54] CONTINUOUS PROCESS FOR PREPARING SODIUM PERCARBONATE

[75] Inventors: Hiromi Sasaki; Hiroshi Ueda; Yasushi Muneno; Hirokazu Kusunoki; Sunao Yamamoto, all of Yamaguchi, Japan

[73] Assignee: Central Glass Company, Limited, Ube, Japan

[21] Appl. No.: 15,052

[22] Filed: Feb. 8, 1993

Related U.S. Application Data

[63] Continuation of Ser. No. 826,531, Jan. 27, 1992, abandoned.

[30] Foreign Application Priority Data

Jan. 25, 1991 [JP] Japan ................... 3-007412
Sep. 18, 1991 [JP] Japan ................... 3-238368

[51] Int. Cl.$^5$ ................ C01B 15/10; C01B 31/00
[52] U.S. Cl. ................ 423/415.2; 23/302 T
[58] Field of Search ......... 423/415 P; 252/186.28; 23/302 T, 301

[56] References Cited

U.S. PATENT DOCUMENTS

| | | | |
|---|---|---|---|
| 4,025,609 | 5/1977 | Matsunaga | 423/415 P |
| 4,118,466 | 10/1978 | Klebe et al. | 423/415 P |
| 4,146,571 | 3/1979 | Will et al. | 423/415 P |
| 4,179,394 | 12/1979 | Pillenburg et al. | 423/415 P |
| 4,409,197 | 10/1983 | Sugano et al. | 423/415 P |

FOREIGN PATENT DOCUMENTS

| | | |
|---|---|---|
| 56-21797 | 5/1981 | Japan . |
| 58-208105 | 12/1983 | Japan . |
| 58-217405 | 12/1983 | Japan . |

*Primary Examiner*—Michael Lewis
*Assistant Examiner*—Stephen G. Kalinchak
*Attorney, Agent, or Firm*—Keck, Mahin & Cate

[57] ABSTRACT

A process of continuously crystalizing sodium percarbonate by the reaction of sodium carbonate with hydrogen peroxide using first and second reaction vessels includes the steps of: (a) continuously feeding a first feed solution containing sodium carbonate and a second feed solution containing hydrogen peroxide into the first reaction vessel, thereby to form therein a first slurry containing seed crystals of sodium percarbonate; (b) continuously discharging the first slurry from the first reaction vessel into the second reaction vessel while step (a) is performed; (c) continuously feeding at least one of hydrogen peroxide and sodium carbonate into the second reaction vessel while steps (a) and (b) are performed thereby to form therein a second slurry containing final sodium percarbonate crystals grown from the seed crystals; (d) continuously discharging the second slurry from the second reaction vessel while steps (a), (b) and (c) are performed; (e) continuously separating the second slurry into the final sodium percarbonate crystals and a mother liquor while steps (a), (b), (c) and (d) are performed; and (f) granulating the final sodium percarbonate crystals thereby to form a final product of sodium percarbonate. According to the process, it is possible to maintain particle size of the final sodium percarbonate crystals not larger than 100 $\mu$m, thereby to efficiently produce sodium percarbonate granules having a satisfactory strength.

9 Claims, No Drawings

CONTINUOUS PROCESS FOR PREPARING SODIUM PERCARBONATE

This is a continuation of application Ser. No. 07/826,531, filed Jan. 27, 1992 now abandoned.

BACKGROUND OF THE INVENTION

1. Field of the Invention

The present invention relates to a continuous process for industrially preparing sodium percarbonate by the reaction of sodium carbonate with hydrogen peroxide.

2. Description of the Prior Art

Sodium percarbonate as well as sodium perborate has been used as a so-called oxygen-type bleaching agent. As compared with a so-called chlorine-type bleaching agent, sodium percarbonate is slightly inferior in the bleaching effect. However, sodium percarbonate acts more gently, for example, on cloth, thereby not damaging the same. Furthermore, sodium percarbonate does not produce a poisonous gas such as chlorine. Thus, sodium percarbonate as a bleaching agent has been recently increasingly used for home or business use.

As a final product, sodium percarbonate is usually produced in the granular form which is easy to be handled. For this purpose, crystalized sodium percarbonate is granulated with a granulator. The granulation can be more easily conducted and the granulated sodium percarbonate is more strengthened, by decreasing particle size of sodium percarbonate crystals. However, in case that sodium percarbonate is produced by crystallization, separation efficiency of the crystals from a slurry becomes worse by decreasing the particle size. On the other hand, by increasing the particle size, the loss of sodium percarbonate in powdery form increases upon granulation thereby to decrease the yield upon granulation, and the granulated sodium percarbonate is lowered in strength, too.

To increase strength of the granules, it has been proposed to add, upon granulation, an organic or inorganic binding agent to the crystals. As the organic binding agent, for example, a water-soluble high-molecular compound such as sodium polyacrylate, starch, or polyethylene glycol has been proposed. As the inorganic binding agent, for example, an aluminum compound such as aluminum phosphate or a silicate such as sodium silicate has been proposed. However, adding the binding agent upon granulation slows a so-called solution velocity of the granules in water upon practical use. The solution velocity is represented by the time required from the introduction of a product into a liquid to the complete dissolution of the same in the liquid. It takes more time to dissolve the granules by adding the binding agent upon granulation.

Thus, it is desired to maintain the particle size of sodium percarbonate crystals in a certain desired range to efficiently produce the granules having a satisfactory strength. Thus, it has been proposed to regulate their particle size by adjusting concentration of a slurry, intensity for stirring the slurry, the amount of a circulating mother liquor, or the like. However, the particle size is not satisfactorily regulated by the above-mentioned adjustments.

There are proposals, for example, JP-A-58-20815 and JP-A-58-217405, of regulating the particle size, in which fine seed crystals of sodium percarbonate pulverized by a dry or wet process are inoculated into a reaction vessel. However, upon pulverization with a grinder, the fine seed crystals tend to be contaminated with impurities such as iron and other metals, thereby accelerating decomposition of hydrogen peroxide and lowering the yield of sodium percarbonate crystals.

For practical use of sodium percarbonate granules as a bleaching agent, the granules are requested to be dissolved in water in a relatively short time. Thus, for example, JP-B2-56-21797 discloses sodium percarbonate granules mixed with a carbonate and an organic acid such as succinic acid, maleic acid or citric acid. Upon dissolution of the granules in water, carbon dioxide bubbles are generated in water by the reaction of the carbonate and the organic acid, thereby speeding up solution velocity of sodium percarbonate granules. However, oxygen content in a predetermined amount of sodium percarbonate granules, which oxygen is effective in bleaching, is lowered by increasing content of the organic acid therein. Furthermore, the organic acid is not suitable for some purpose.

To speed up solution velocity of the granules, the size of the same can be made small. However, this makes the same difficult to be handled.

SUMMARY OF THE INVENTION

It is therefore an object of the present invention to provide an improved process for industrially crystalizing sodium percarbonate by the reaction of sodium carbonate with hydrogen peroxide, which process allows particle size of sodium percarbonate crystals to be maintained in a certain desired range, thereby to efficiently produce sodium percarbonate granules having a satisfactory strength.

It is another object of the present invention to provide an improved process for crystalizing sodium percarbonate, which process allows the granules to have a satisfactory solution velocity.

According to the present invention, there is provided a process of continuously crystalizing sodium percarbonate by the reaction of sodium carbonate with hydrogen peroxide using first and second reaction vessels, the process including the steps of: (a) continuously feeding a first feed solution containing sodium carbonate and a second feed solution containing hydrogen peroxide into the first reaction vessel, thereby to form therein a first slurry containing seed crystals of sodium percarbonate; (b) continuously discharging the first slurry from the first reaction vessel into the second reaction vessel while step (a) is performed; (c) continuously feeding at least one of hydrogen peroxide and sodium carbonate into the second reaction vessel while steps (a) and (b) are performed thereby to form therein a second slurry containing final sodium percarbonate crystals grown from the seed crystals; (d) continuously discharging the second slurry from the second reaction vessel while steps (a), (b) and (c) are performed; (e) continuously separating the second slurry into the final sodium percarbonate crystals and a mother liquor while steps (a), (b), (c) and (d) are performed; and (f) granulating the final sodium percarbonate crystals thereby to form a final product of sodium percarbonate.

In the step (b), for discharging the first slurry, for example, it may be overflowed or pumped from the first reaction vessel, or may be drained from the bottom of the first reaction vessel. In the step (d), the same measures as those in the step (b) may be employed for discharging the second slurry.

By the above process, it is possible to produce the final crystals not larger than 100 μm in particle size thereby to increase yield of the granules and strength of the same.

DESCRIPTION OF THE PREFERRED EMBODIMENTS

By the above process, the seed crystals are produced in the first reaction vessel and the final crystals are grown from the seed crystals in the second reaction vessel, so that particle size of the final crystals are maintained in a certain desired range.

In this invention, the mother liquor which is separated from the second slurry is totally or partially recirculated into the first reaction vessel. Furthermore, in this invention, a predetermined amount of hydrogen peroxide is totally fed into the first reaction vessel or the predetermined amount of the same is separated into two parts and respectively fed into the first and second reaction vessels.

For granulation of the final crystals, it is preferable to produce the same which are not larger than 100 $\mu$m in size, and more preferably which are in a range from about 10 $\mu$m to about 50 $\mu$m in size.

The size of the final crystals can be controlled by adjusting residence time of the first slurry in the first reaction vessel. The seed crystals produced in the first reaction vessel become smaller in size by decreasing the residence time in the first reaction vessel. Due to this, the final crystals produced in the second reaction vessel become smaller in size, too. On the other hand, the seed crystals and the final crystals become larger in size by increasing the residence time in the first reaction vessel. Thus, it is preferred to limit the residence time in the first reaction vessel not longer than 20 minutes, more preferably not longer than 5 minutes, to produce the final crystals which are preferable in size. The residence time in the first reaction vessel can be controlled, for example, by adjusting the effective volume of the first reaction vessel or feeding rate of the mother liquor recirculated into the first reaction vessel.

Residence time of the second slurry in the second reaction vessel is usually in a range from 30 min to 3 hr.

The size of the final crystals can be controlled by the feeding manner of hydrogen peroxide, too. As compared with the size of the final crystals produced by a manner in which the total amount of a predetermined amount of hydrogen peroxide is fed into the first reaction vessel, the size of the final crystals increases by a manner in which the predetermined amount is separated into two parts and respectively fed into the first and second reaction vessels. As compared with the above-mentioned former manner, the amount of the seed crystals decreases due to reduction in the amount of hydrogen peroxide fed into the first reaction vessel, and the final crystals increases in size due to hydrogen peroxide fed into the second reaction vessel in the above-mentioned latter manner.

This invention uses sodium carbonate which may be sodium carbonate light or sodium carbonate heavy on an industrial scale. It is preferred to use hydrogen peroxide solution of which concentration is in a range from 30 wt % to 70 wt %, and more preferably 60 wt % in practical use.

In this invention, it is preferable to use a water-soluble inorganic salt for effectively crystallizing sodium percarbonate. Solubility of sodium percarbonate dissolved in the mother liquor is lowered by feeding the salt, thereby suppressing decomposition of hydrogen peroxide and decreasing loss of hydrogen peroxide upon purge of the recirculating mother liquor. Thus, as compared with a process without feeding the salt, the crystals are lowered in size by feeding the salt. As the salt, it is preferable to use a salt containing sodium ion, such as sodium chloride, sodium sulfate, sodium bicarbonate, or the like. Of these, it is preferable to use sodium sulfate because solution velocity of the final crystals produced by a process in which sodium sulfate is used is faster than that of the final crystals produced by a process in which another salt is used. It is preferable that a fresh feed solution contains 2 to 20 wt % of sodium sulfate, and more preferably 5 to 15 wt % of the same.

In this invention, it is preferable to add, upon crystalizing sodium percarbonate, a water-soluble alkali-metal silicate such as sodium silicate, potassium silicate or the like as a binding agent. It should be noted that solution velocity of the granules is not slowed by the addition of the silicate upon the crystallization. It is preferable to add the silicate such that the final crystals contain 0.01 to 1 wt %, expressed as $SiO_2$ of the silicate.

In this invention, usual stabilizers not serving as binders may be added upon crystalizing or granulating sodium percarbonate. Furthermore, in this invention, a diluent such as sodium bicarbonate, sodium carbonate or sodium sulfate may be added to the final crystals upon granulation thereof. The diluent acts to suppress a sudden oxygen gas emission upon heating sodium percarbonate.

In this invention, it is preferable to granulate sodium percarbonate with a conventional extruding granulator. However, if desired, any other granulating methods may be employed.

EXAMPLE 1

A first reaction vessel was connected to a second reaction vessel such that, when a liquid is continuously introduced into the first reaction vessel, the liquid overflows into the second reaction vessel. The second reaction vessel had a capacity of 6.5 liters.

Preparatory to a continuous reaction operation using the above described apparatus, a slurry was prepared in the second reaction vessel, the slurry including a solution containing 5.1 wt % of sodium carbonate, 1.0 wt % of hydrogen peroxide, 16 wt % of sodium chloride and 0.15 wt % of EDTA, and 20 wt % of sodium percarbonate as a solid.

At the start of the continuous reaction operation, 60% hydrogen peroxide solution and a fresh feed solution containing 5.1 wt % of sodium carbonate, 1.0 wt % of hydrogen peroxide and 16 wt % of sodium chloride were continuously fed into the first reaction vessel at constant rates of 880 g/hr and 5950 g/hr, respectively. In the first reaction vessel, a suitable stirrer was operated at a speed of 200 rpm, and by such stirring it was possible to maintain uniform production of seed crystals of sodium percarbonate in the feed solution, thereby producing, in the first reaction vessel, a first slurry containing the seed crystals. The continuous reaction was made so as to maintain residence time of the first slurry in the first reaction vessel to be 1 min. Then, the first slurry was continuously overflowed from the first reaction vessel into the second reaction vessel. Simultaneously, granular anhydrous sodium carbonate, EDTA and sodium chloride were continuously fed into the second reaction vessel at constant rates of 1100 g/hr, 8 g/hr and 70 g/hr, respectively. Similar to the first reaction vessel, a suitable stirrer was operated in the second reaction vessel and by such stirring it was possible to maintain uniform production of final sodium percarbonate crystals grown from the seed crystals in the second reaction vessel, thereby producing a second slurry containing the final crystals. The second slurry was continuously discharged by overflow from the second reaction vessel. The continuous reaction in the second reaction vessel was made so as to maintain temperature of the second slurry in the second reaction vessel and residence time of the second slurry in the second reaction vessel to be 25° C. and 1 hr, respectively. The final crystals were continuously separated from the second slurry with a centrifuge. A mother liquor which is produced by the centrifugal separation was continuously recirculated into the first reaction vessel for crystalizing the seed crystals. The final crystals were adjusted to have water content ranging from 12% to 14%, and were kneaded for 5 min, followed by granulation with a two-way extruding pelletter which is a trade name. Then, granules of sodium percarbonate were dried in a fluidized-bed dryer, thereby producing a final granular product as a bleaching agent. The final product was sufficient in strength as a bleaching agent.

Yield upon the granulating and drying processes was determined, the yield being expressed as a percentage of the amount of the final granular dried product to the amount of sodium percarbonate which was used for the granulation. The value of the yield is shown in the Table.

The following tests were made on the seed crystals, the final crystals, and the final granular product.

To measure the average size of the seed crystals, the first slurry overflowed from the first reaction vessel was sampled and centrifuged, thereby producing a cake of the seed crystals. Then, the cake was dried and dispersed in ethanol to determine the average size of the seed crystals with a laser-type particle-size distribution measurement apparatus. The test result is shown in the Table.

To measure the average size of the final crystals, the second slurry overflowed from the second reaction vessel was sampled after a lapse of 8 hr of the continuous reaction process. Then, the second slurry was centrifuged at a force of 600 G for 3 min, thereby producing a cake of the final crystals. To determine the average size of the final crystals, the cake of the final crystals was treated in the same manner as that for the cake of the seed crystals. The result is shown in the Table.

To determine a so-called powdering rate of the final granular product, 100 g of the final product (16 mesh to 32 mesh) was put into a 60-mesh sieve, and then shaken at 500 rpm for 1 hr. Then, the weight of powder which has been rubbed away from the final product and which has been passed through the sieve was measured. The test result is shown in the Table.

The following Examples 2–13 are modifications of Example 1. Therefore, the same operation conditions of these Examples 2–13 as that of Example 1 will be omitted from the following description. The continuous reaction using the first and second reaction vessels was employed for producing the seed crystals and the final crystals throughout these examples 2–13. The final products produced in the examples 2–9 were subjected to the above-described tests, and the test results are shown in the Table.

EXAMPLE 2

The continuous reaction of Example 1 was repeated under the same operation conditions except that residence time of the first slurry in the first reaction vessel was maintained to be 5 min.

EXAMPLE 3

The continuous reaction of Example 1 was repeated under the same operation conditions except that the total weight of hydrogen peroxide solution which has been fed into the first reaction vessel in Example 1 was divided into halves and then respectively fed into the first and second reaction vessels in accordance with the respective residence times in Example 1.

EXAMPLE 4

The continuous reaction of Example 1 was repeated under the same operation conditions except that the total weights of hydrogen peroxide solution and the fresh feed solution which have been fed into the first reaction vessel in Example 1 were respectively divided into halves and then respectively fed into the first and second reaction vessels in accordance with the respective residence times of Example 1.

EXAMPLE 5

The continuous reaction of Example 1 was repeated under the same operation conditions except that 0.5 wt % of EDTA, 0.3 wt % of sodium silicate and 0.6 wt % of 75% phosphoric acid solution were added to the cake of the final crystals for stabilizing the final granular product.

EXAMPLE 6

A continuous reaction operation which is similar to that of Example 1 was conducted. However, preparatory to the continuous reaction operation, a slurry was prepared in the second reaction vessel, the slurry including a solution containing 12.6 wt % of sodium carbonate, 2.5 wt % of hydrogen peroxide and 0.18 wt % of EDTA, and 20 wt % of sodium percarbonate as a solid.

At the start of the continuous reaction operation, 60% hydrogen peroxide solution and a fresh feed solution containing 12.6 wt % of sodium carbonate and 2.5 wt % of hydrogen peroxide were continuously fed into the first reaction vessel at constant rates of 890 g/hr and 5970 g/hr, respectively. Then, the first slurry containing the seed crystals was continuously overflowed from the first reaction vessel into the second reaction vessel. Simultaneously, granular anhydrous sodium carbonate and EDTA were continuously fed into the second reaction vessel at constant rates of 1110 g/hr and 8 g/hr, respectively.

EXAMPLE 7

The continuous reaction of Example 6 was repeated under the same operation conditions except that residence time of the first slurry in the first reaction vessel was maintained to be 3 min.

EXAMPLE 8

A continuous reaction operation which is similar to that of Example 1 was conducted. However, preparatory to the continuous reaction operation, a slurry was prepared in the second reaction vessel, the slurry including a solution containing 7.5 wt % of sodium carbonate, 1.7 wt % of hydrogen peroxide, 20.0 wt % of sodium sulfate and 0.18 wt % of EDTA, and 20 wt % of sodium percarbonate as a solid.

At the start of the continuous reaction operation, 60% hydrogen peroxide solution and a fresh feed solution containing 7.5 wt % of sodium carbonate, 1.7 wt % of hydrogen peroxide and 20.0 wt % of sodium sulfate were continuously fed into the first reaction vessel at constant rates of 880 g/hr and 5930 g/hr, respectively. Then, the first slurry containing seed crystals was continuously overflowed from the first reaction vessel into the second reaction vessel. Simultaneously, granular anhydrous sodium carbonate and EDTA were continuously fed into the second reaction vessel at constant rates of 1100 g/hr and 8 g/hr, respectively.

EXAMPLE 9

The continuous reaction of Example 1 was repeated under the same operation conditions except that residence time of the first slurry in the first reaction vessel was maintained to be 25 min.

EXAMPLE 10

A continuous reaction operation which is similar to that of Example 1 was conducted. However, preparatory to the continuous reaction operation, a slurry was prepared in the second reaction vessel, the slurry including a solution containing 10.5 wt % of sodium carbonate, 1.6 wt % of hydrogen peroxide, 12.5 wt % of sodium sulfate and 0.03 wt % of sodium silicate which is expressed as $SiO_2$ and 0.15 wt % of EDTA, and 20 wt % of sodium percarbonate as a solid.

At the start of the continuous reaction operation, 60% hydrogen peroxide solution and a fresh feed solution containing 10.5 wt % of sodium carbonate, 1.6 wt % of hydrogen peroxide, 12.5 wt % of sodium sulfate and 0.03 wt % of sodium silicate which is expressed as $SiO_2$ and 0.15 wt % of EDTA were continuously fed into the first reaction vessel at constant rates of 880 g/hr and 6000 g/hr, respectively. Then, the first slurry containing the seed crystals was continuously overflowed from the first reaction vessel into the second reaction vessel. Simultaneously, granular anhydrous sodium carbonate, sodium silicate which is expressed as $SiO_2$, EDTA and sodium sulfate were continuously fed into the second reaction vessel at constant rates of 1100 g/hr, 1.6 g/hr, 8 g/hr and 62 g/hr, respectively. The final crystals were separated from the second slurry with a centrifuge, thereby producing a cake of the final crystals. 0.2 wt % of magnesium sulfate as a stabilizer was added to the cake of the final crystals. Then, the cake was adjusted to have water content ranging from 10% to 15%, and kneaded for 15 min.

To measure the average size of the final crystals, the second slurry overflowed from the second reaction vessel was sampled after a lapse of 8 hr of the continuous reaction process, and was centrifuged at a force of 1000 G for 3 min. Water content of a thus obtained cake was measured. The results are shown in the Table.

The following tests were conducted on the final granular product.

A test on the powdering rate on the final granular product was conducted, the test being the same as that of Example 1.

A test on solution velocity of the final granular product was conducted in a manner described in the following.

5 g of the final granular product was introduced into 1 l of water maintained to have a temperature of 0° C. while the water was being stirred at a rate of 200 rpm. Then, a time from the introduction of the product to the complete dissolution of the same in the water was measured. The test result is shown in the Table.

The final products produced in Example 11-13 were subjected to the same tests as those of Example 10, and the test results are shown in the Table.

EXAMPLE 11

The continuous reaction of Example 10 was repeated under the same operation conditions except that, in addition to 0.2 wt % of magnesium sulfate in Example 10, 20.0 wt % of sodium bicarbonate as a diluent was added to the cake of the final crystals which has been produced in Example 10.

EXAMPLE 12

The continuous reaction of Example 10 was repeated under the same operation conditions except that, in addition to 0.2 wt % of magnesium sulfate in Example 10, 18.0 wt % of sodium carbonate as a diluent was added to the cake of the final crystals which has been produced in Example 10.

EXAMPLE 13

The continuous reaction of Example 10 was repeated under the same operation conditions except that, in addition to 0.2 wt % of magnesium sulfate in Example 10, 18.0 wt % of sodium carbonate as a diluent and 0.05 wt % of sodium tripolyphosphate as another stabilizer were added to the cake of the final crystals which has been produced in Example 10.

COMPARATIVE EXAMPLE

As compared with Example 1, only one reaction vessel having a capacity of 6.5 liters was used in Comparative example.

Preparatory to a continuous reaction operation, a slurry was prepared in the reaction vessel, the slurry including a solution containing 5.1 wt % of sodium carbonate, 1.0 wt % of hydrogen peroxide, 16 wt % of sodium chloride and 0.15 wt % of EDTA, and 20 wt % of sodium percarbonate as a solid.

At the start of the continuous reaction operation, 60% hydrogen peroxide solution, granular anhydrous sodium carbonate, EDTA, and sodium chloride were continuously added to the slurry in the reaction vessel at constant rates of 880 g/hr, 1100 g/hr, 8 g/hr and 70 g/hr, respectively. Simultaneously, a fresh feed solution containing 5.1 wt % of sodium carbonate, 1.0 wt % of hydrogen peroxide and 16 wt % of sodium chloride was continuously added to the slurry in the reaction vessel at a constant rate of 5950 g/hr. In the reaction vessel, a suitable stirrer was operated so as to maintain uniform production of sodium percarbonate crystals, thereby producing another slurry containing the final crystals. The continuous reaction was made so as to maintain temperature of the another slurry in the reaction vessel and residence time of the another slurry in the reaction vessel to be 25° C. and 1 hr, respectively. Then, the another slurry containing the final crystals was continuously discharged by overflow from the reaction vessel. The final crystals were continuously separated from the another slurry with a centrifuge, thereby producing a cake of the final crystals. A mother liquor which is produced by the centrifugal separation was continuously recirculated into the reaction vessel. To produce a final granular product, the cake was treated in the same manner as described in Example 1.

To measure the average size of the final crystals, the same treatment as that for the final crystals in Example 1 was conducted. Water content of the cake containing the final crystals was measured. The results are shown in the Table.

The yield upon the granulating and drying processes is shown in the Table.

The same test of the powdering rate as described in Example 1 was conducted on the final granular product.

As shown in the Table, all the solution velocities of the final products in Examples 10–13 were satisfactory for practical use.

TABLE

|  | Particle Size of Seed Crystals (μm) | Particle Size of Final Crystals (μm) | Water Content (%) | Yield (%) | Powdering rate (%) | Solution Velocity (sec.) |
|---|---|---|---|---|---|---|
| Ex. 1 | 9.9 | 25 | 14.3 | 92 | 2.5 | — |
| Ex. 2 | 15.1 | 40 | 11.5 | 80 | 3.5 | — |
| Ex. 3 | 10.9 | 36 | 13.1 | 88 | 3.2 | — |
| Ex. 4 | 11.5 | 43 | 10.5 | 83 | 3.7 | — |
| Ex. 5 | 10.0 | 27 | 14.5 | 90 | 2.7 | — |
| Ex. 6 | 12.2 | 31 | 13.8 | 86 | 3.3 | — |
| Ex. 7 | 13.5 | 36 | 13.1 | 84 | 3.2 | — |
| Ex. 8 | 10.0 | 26 | 14.2 | 91 | 2.6 | — |
| Ex. 9 | 32 | 74 | 8.1 | 60 | 24.1 | — |
| Ex. 10 | — | 28 | 14.0 | — | 2.8 | 90 |
| Ex. 11 | — | — | — | — | 3.5 | 110 |
| Ex. 12 | — | — | — | — | 3.1 | 100 |
| Ex. 13 | — | — | — | — | 3.0 | 100 |
| Comp. Ex. | — | 150 | 6.1 | 40 | 36.5 | — |

What is claimed is:

1. In a process of continuously crystallizing sodium percarbonate by the reaction of sodium carbonate with hydrogen peroxide using first and second reaction vessels, the process comprising the steps of:
   (a) continuously feeding a first fed solution comprising sodium carbonate and hydrogen peroxide and a hydrogen peroxide solution into the first reaction vessel, thereby to form therein a first slurry containing seed crystals of sodium percarbonate;
   (b) continuously discharging the first slurry from the first reaction vessel into the second reaction vessel while step (a) is performed wherein residence time of said first slurry in said first reaction vessel is not longer than 5 minutes;
   (c) continuously feeding at least one of hydrogen peroxide and sodium carbonate into the second reaction vessel while steps (a) and (b) are performed thereby to form therein a second slurry containing final sodium percarbonate crystals grown from the seed crystals, the final sodium percarbonate crystals having a particle size of less than 100 μm;
   (d) continuously discharging the second slurry from the second reaction vessel while steps (a), (b) and (c) are performed;
   (e) continuously separating the second slurry into the final sodium percarbonate crystals and a mother liquor while steps (a), (b), (c) and (d) are performed;
   (f) continuously recirculating said mother liquor into the first reaction vessel while steps (a)–(e) are performed; and
   (g) granulating the final sodium percarbonate crystals thereby to form a final product of sodium percarbonate.

2. A process according to claim 1, wherein residence time of said first slurry in the first reaction vessel is not longer than 20 min.

3. A process according to claim 1, further comprising the step of continuously feeding a water-soluble inorganic salt containing sodium ion but differs from said sodium carbonate into the first reaction vessel while steps (a)–(f) are performed.

4. A process according to claim 3, wherein said first feed solution contains 2 wt % to 20 wt % of said water-soluble inorganic salt.

5. A process according to claim 4, wherein said water-soluble inorganic salt is sodium sulfate.

6. A process according to claim 1, further comprising the step of continuously feeding a water-soluble alkali-metal silicate into the first reaction vessel while steps (a)–(f) are performed.

7. A process according to claim 6, wherein said silicate is continuously fed into the first reaction vessel such that the final crystals contain 0.01 to 1 wt %, expressed as $SiO_2$, of said silicate.

8. A process according to claim 7, wherein said silicate is one of sodium silicate and potassium silicate.

9. A process according to claim 1, wherein the final sodium percarbonate crystals have a particle size in a range from about 10 to about 50 μm.

* * * * *